Oct. 3, 1967
W. R. CAMMACK ET AL  3,344,751
DEVICE FOR MAKING CONFECTIONS
Original Filed Jan. 21, 1964   2 Sheets-Sheet 1
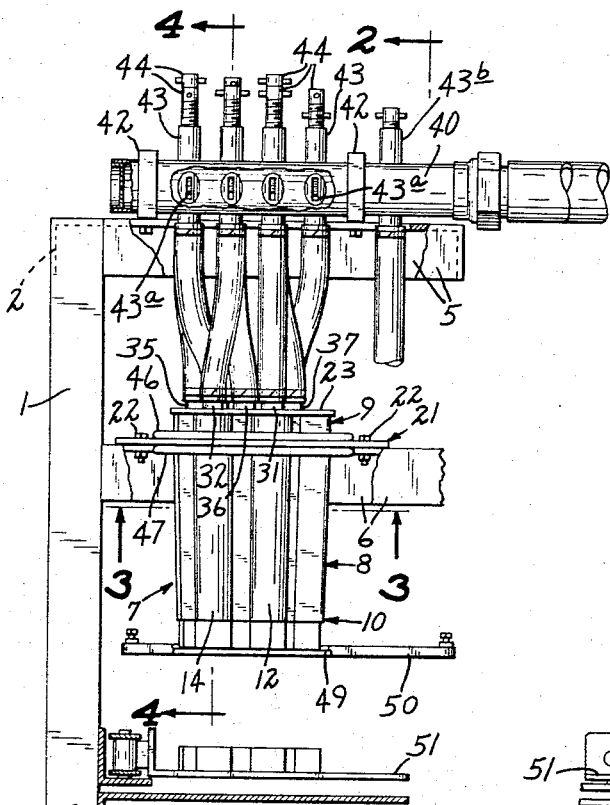
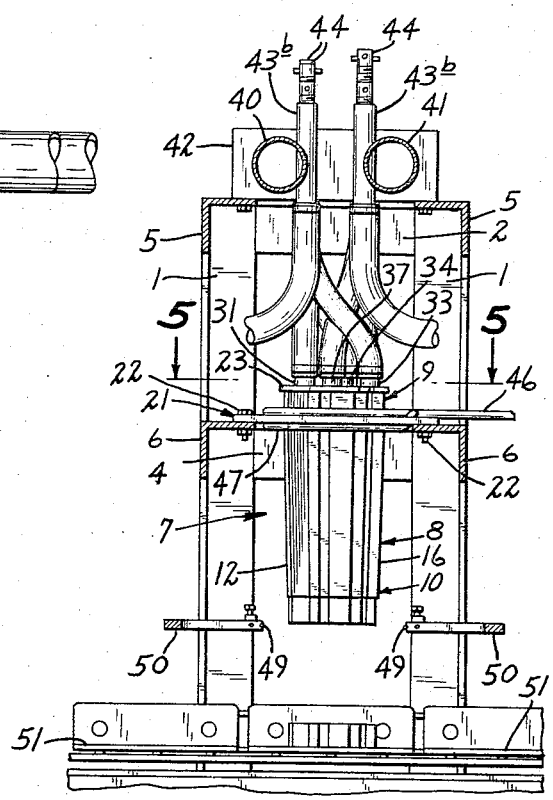
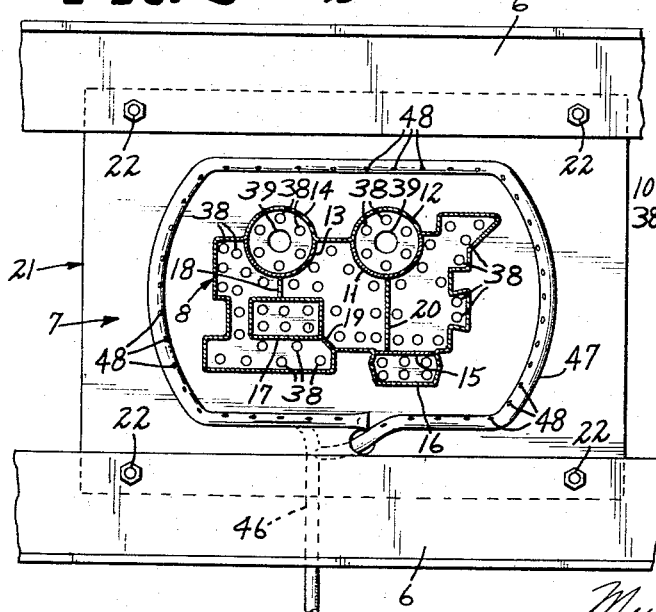
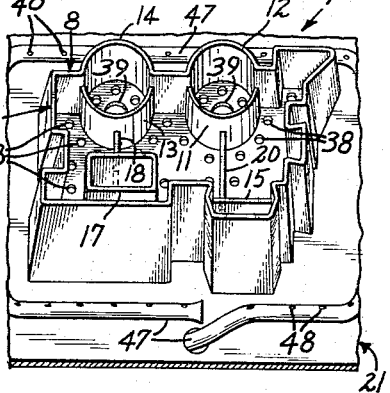
INVENTORS.
WILLIAM ROGER CAMMACK
VERNON C. OLSON
BY
*Merchant, Merchant & Gould*
ATTORNEYS Oct. 3, 1967  W. R. CAMMACK ET AL  3,344,751
DEVICE FOR MAKING CONFECTIONS
Original Filed Jan. 21, 1964
2 Sheets-Sheet 2
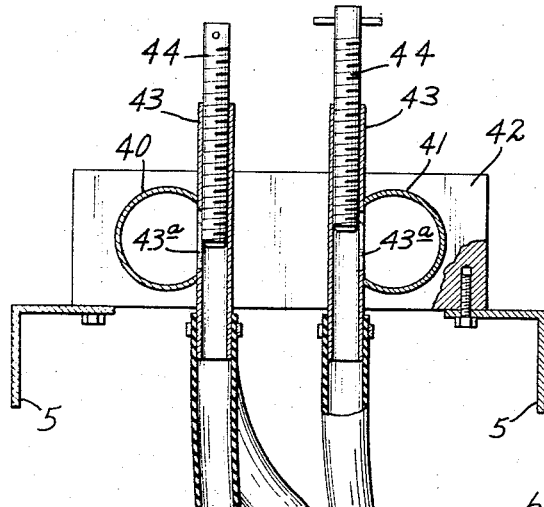
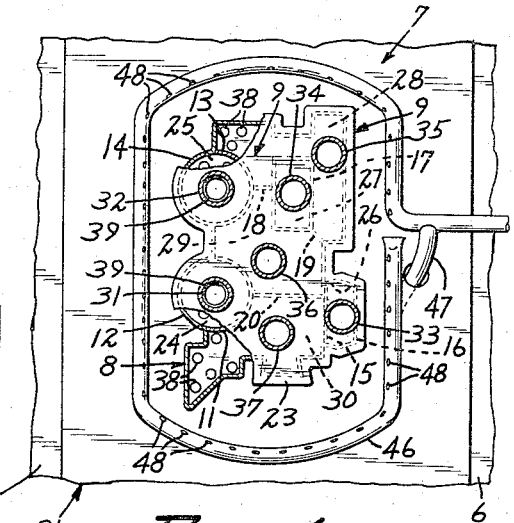
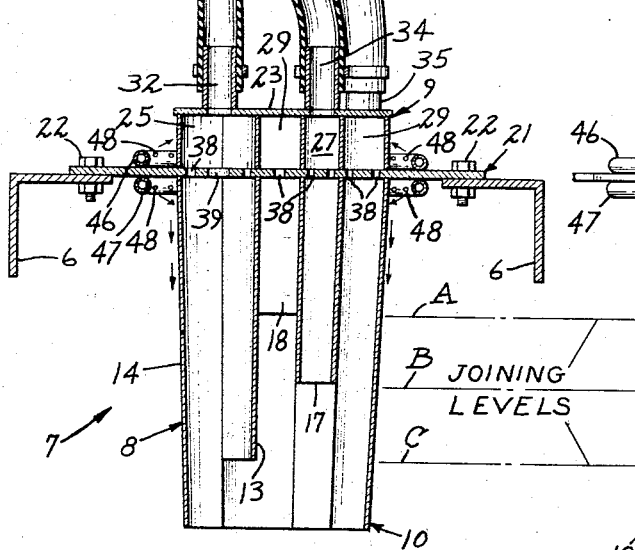
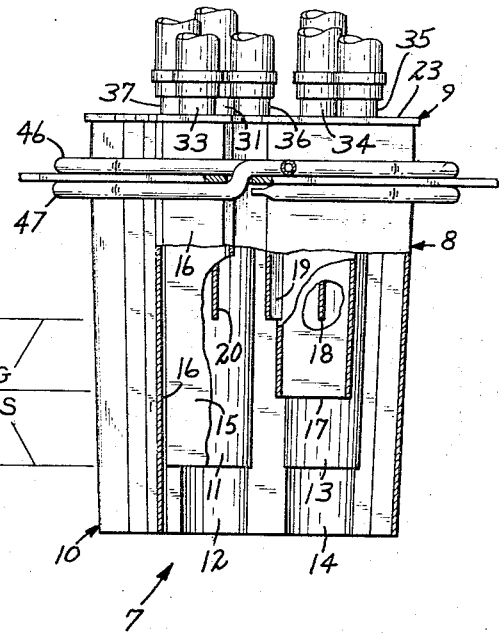
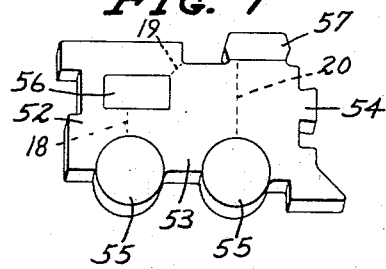
INVENTORS.
WILLIAM ROGER CAMMACK
VERNON C. OLSON
BY
*Merchant, Merchant & Gould*
ATTORNEYS

United States Patent Office 3,344,751
Patented Oct. 3, 1967

3,344,751
DEVICE FOR MAKING CONFECTIONS
William Roger Cammack and Vernon C. Olson, St. Paul, Minn., assignors to Marigold Foods, Inc., Minneapolis, Minn., a corporation of Minnesota
Continuation of application Ser. No. 339,151, Jan. 21, 1964. This application Nov. 4, 1966, Ser. No. 592,230
7 Claims. (Cl. 107—1)

ABSTRACT OF THE DISCLOSURE

Apparatus for forming ice cream and confections into irregular but precise forms or configurations, wherein the apparatus includes a nozzle or die head having a peripheral wall formed to define the outline of the confections, wherein the confection extruded from the die head is sliced or separated into slices or serving portions, wherein the die head is formed to define confection streams which terminate at various elevations with respect to one another so as to merge the streams together, and wherein the die head and the peripheral wall thereof are tapered so as to weld the merging streams together in a manner to produce confections wherein the portions formed by different streams do not separate during later handling.

---

This is a continuation of application Ser. No. 339,151, filed Jan. 21, 1964, now abandoned.

This invention relates generally to devices for making confections, and more particularly it relates to a novel device for making frozen confections, such as ice cream, of the type having an irregular outline or shape so as to resemble various articles or things.

There has been a long-standing desire on the part of creameries or ice cream manufacturers to manufacture ice cream treats or confections in the shape of various articles or things, such as animals or various toys, for example. Particular configurations might be ice cream confections in the shape of a train, car, Santa Claus, or various animals, such as a turkey, bunny, or zoo animals. Previous attempts at manufacturing confections of the general type noted above have been relatively unsuccessful, particularly when relatively complicated or intricate designs or configurations are desired since with previous attempts, the accuracy of the reproductions has been relatively poor and the outline of the configurations have usually been uneven. A specific problem has been the inability to produce detailed configurations since the projections or other details of the outline are often obscured or eliminated. A further problem with previous practices has been the inability to successfully combine ice cream of various colors or flavors into a single confection and to do so within a degree of accuracy.

In view of the above, an important object of the present invention is the provision of a device for making confections which eliminates all of the above-noted problems and provides an ice cream confection in which intricate designs or configurations may be accurately reproduced and also in which confections of various colors or flavors may be accurately and suitably combined with one another in generally any desired pattern.

Generally, the present invention comprises a novel extruding die head formed to define the outline of the confections to be manufactured, and means is provided for introducing the ice cream in a generally plastic condition to the die head and means is also provided for slicing the generally continuous extrusion produced by said head.

An important object of the present invention is the provision of a novel extruding die head so designed and constructed to produce confections of the general type noted above with greatly improved accuracy and quality.

A further object of the present invention is the provision of a device for producing such confections which is designed and constructed to permit the manufacture of the same in detailed configurations and intricate designs heretofore believed impossible.

Still further objects of the present invention reside in the provision of a novel device for making confections which is simple in construction, durable throughout long periods of continued use, and operative so as to permit production of the confections at a relatively low level of cost.

The above and still further objects and advantages of the present invention will become apparent firom a consideration of the following detailed specification, appended claims and accompanying drawings. Referring to the drawings, wherein like reference characters indicate like parts or elements throughout the several views:

FIG. 1 is a view in elevation of the present invention and showing one illustrative configuration of the die head and confection produced thereby, some parts being broken away and some parts shown in section;

FIG. 2 is a view in vertical section taken on the line 2—2 of FIG. 1;

FIG. 3 is an enlarged view in horizontal section taken on the line 3—3 of FIG. 1;

FIG. 4 is an enlarged view in vertical section taken generally on the line 4—4 of FIG. 1, some parts being broken away;

FIG. 5 is an enlarged view in horizontal section taken on the line 5—5 of FIG. 2, some parts being broken away;

FIG. 6 is an enlarged view of the die head and related structure of the present invention, some parts being broken away and some parts shown in section;

FIG. 7 is a view in perspective showing an illustrative sample of a confection produced by the present invention; and FIG. 8 is a view in perspective of the die head of the present invention.

Referring to the drawings, and particularly FIGS. 1 and 2 thereof, a supporting frame structure constructed from angle iron or other suitable material is shown therein. The frame structure comprises a pair of spaced vertical bars 1 connected by an upper crossbar 2, an intermediate crossbar 3, and a lower crossbar 4. A pair of upper side bars 5 project horizontally from the vertical bars 1, and a pair of intermediate side bars 6 also project horizontally from the vertically bars 1 in downwardly spaced relation to the upper bars 5, as shown particularly in FIG. 1. Since the particular frame structure is not an important feature of the present invention, further showing and description thereof will be omitted.

An important feature of the present invention resides in the provision of an extruding die head, represented generally by the reference numeral 7. The die head 7 is mounted on the intermediate side bars 6 of the supporting frame struture, and the die head 7 comprises an upstanding peripheral side wall 8 formed to a configuration to define the outline of the confection to be produced by the device. The peripheral wall 8 of the die head 7 is preferably formed from a relatively thin sheet metal, and at least the lower portion thereof is ductile, so that the same may be formed into generally any desired configuration. By way of example and illustration only, the peripheral wall 8 of the die head shown in the drawings is in the form of a train engine. The upper end portion of the extruding die head 7 is represented by the reference numeral 9, and the lower end portion thereof is represented by the reference numeral 10.

An important feature of the present invention is the construction of the peripheral wall 8 of the die head 7 so as to taper slightly inwardly at its outlet end with respect to its inlet end. This tapering of the die head peripheral wall 8 serves to compress the ice cream passing therethrough so as to fuse or weld together the various portions of the ice cream passing through the die head 7. The die head 7 is further formed to define a plurality of inner partition elements which separate the die head 7 into a plurality of generally tubular extruding sections. By way of example, the drawings illustrate a die head 7 formed in the configuration of a train engine, as shown particularly in FIG. 3. A pair of spaced generally semicircular wheel partitions are defined by the die head 7. The front wheel partition is represented by the reference numeral 11, and the same aligns with the front wheel portion 12 of the peripheral wall 8. The rear wheel partition is represented by the reference numeral 13, and the same also aligns with the rear wheel portion 14 of the peripheral wall 8. The lower ends of the wheel partitions 11, 13 are generally coplanar and terminate in spaced relation above the lower end portion 10 of the die head 7, as shown particularly in FIGS. 4 and 6 of the drawings.

The die head 7 further defines a stack partition 15 which joins with a stack portion 16 of the peripheral wall 8, and the lower end of the stack partition 15 is generally coplanar with the wheel partitions 11, 13. Referring to FIGS. 3 and 6, it will be noted that a generally rectangular window partition 17 is defined by the die head 7, and the lower end thereof terminates in spaced relation above the lower ends of the wheel partitions 11, 13 and the stack partition 15, as noted in FIGS. 4 and 6 of the drawings. It is also desirable to divide the remainder of the area of the die head 7 into sections for better extrusion performance, and therefore a divider partition 18 is secured between the rear wheel partition 13 and the window partition 17. Also, a divider partition 19 is secured between the window partition 17 and an adjacent corner portion of the peripheral wall 8, as shown particularly in FIG. 3. Further, a divider partition 20 is secured between the front wheel partition 11 and the stack partition 15. All of the divider partitions 18–20 have their lower ends terminating in generally horizontal alignment at an elevation above the lower end of the window partition 17, as shown particularly in FIGS. 4 and 6 of the drawings. As noted previously, the taper of the die head 7 fuses or welds together the adjacent streams of ice cream being extruded through the various sections of the die head 7 so as to prevent later separation of the various portions of the ice cream. The joining or fusing levels of the various streams of ice cream are shown in FIGS. 4 and 6, and by way of example, the main body portion of the illustrated engine separated by the divider partitions 18–20 would fuse or join together at the level A, and upon further extrusion the window section would be added or joined thereto at the level B, and then the wheel and stack sections would be added at the level C. Thereby, the extruded ice cream leaving the lower end portion 10 of the die head 7 would have the various confection sections firmly fused or welded together so as to prevent later separation thereof. It is noted that the various sections of the die head 7 may carry ice cream or confection of various flavors or colors, and for example the stack, window and wheels of the train engine shown in FIG. 7 could carry a confection of one color whereas the remaining body portion of the engine could carry a confection of another color or flavor. As shown in FIG. 7, the main body portion of the train engine separated by the divider partitions 18–20 (dotted lines in FIG. 7) would preferably carry a confection of the same color or flavor so as to present a uniform appearance of the main body portion of the figure. It is also noted that the die head 7 is elongated in an axial direction so as to permit the lower ends of the partition elements adjacent the outlet end of the die head 7 to terminate at various elevations with respect to the outlet end of the die head 7 whereby the adjacent inner sections carrying the confection may open together at various elevations above the outlet end of the die head 7.

Another important feature of the present invention is the provision of a generally flat distributor plate, represented generally by the reference numeral 21, interposed or inserted in the die head 7 generally transversely to the axis thereof. The distributor plate 21 is disposed in spaced relation to the upper or inlet end portion 9 of the die head 7 so as to intersect the previously noted inner partitions of the die head 7. The distributor plate 21 is of a larger diameter than the diameter of the die head 7 and is of course rigidly and securely connected, as by welding or the like, to the peripheral wall 8 and the inner partition walls of the die head 7. The distributor plate 21 mounts the die head 7 to the intermediate side bars 6 of the supporting frame structure by means of suitable bolts 22. The upper end of the die head 7 is provided with a rigidly secured end plate 23, and the distributor plate 21 with the end plate 23 defines a pressure chamber therebetween. More precisely, the various inner partition walls of the die head 7 divide the pressure chamber into a plurality of pressure chamber sections which are of course generally axially aligned with the corresponding inner sections of the die head 7 disposed below the distributor plate 21. The wheel pressure chamber sections are represented by the reference numerals 24, 25, the stack chamber section by the reference numeral 26, and the window chamber section by the reference numeral 27. The rear pressure chamber section corresponding to the rear portion of the train engine is represented by the reference numeral 28, the intermediate chamber section by the reference numeral 29, and the front chamber section by the reference numeral 30.

Confection in a plastic condition is introduced into the various pressure chamber sections by openings defined in the end plate 23, and such openings are fitted with short pipe nipples as will be noted. The pipe nipples for the wheel chamber sections 24, 25 are represented by the reference numerals 31, 32, respectively; the pipe nipple for the stack chamber section 26 is represented by the reference number 33; the pipe nipple for the window chamber section 27 is denoted by the reference numeral 34; and the pipe nipples for the rear, intermediate and front chamber sections 28–30 are denoted by the numerals 35–37. See particularly FIGS. 5 and 6. The ice cream or confection in a plastic condition is introduced from the various pressure chamber sections 24–30 into the tubular sections below the distributor plate 21 by means of a plurality of spaced inlet apertures 38 defined in the distributor plate 21. In order to insure that the confection is completely distributed around the periphery of each of the extruding sections of the die head below the distributor plate 21, and particularly into the corners and crevices thereof, at least some of the inlet apertures 38 are generally located around the periphery of the said extruding sections, as shown particularly in FIG. 3. Also, a pair of larger apertures 39 are defined in the distributor plate 21, and each one thereof is generally centrally located with respect to the wheel sections, as also shown in FIG. 3.

A pair of main trunk conduits 40, 41 are mounted on top of the upper side bars 5 of the supporting frame structure described above by means of a pair of spaced mounting bars 42, as shown particularly in FIGS. 1 and 2. A plurality of valve tubes 43 are generally tangentially disposed with respect to the trunk conduits 40, 41 and in axially spaced relationship to the conduits 40, 41. The valve tubes 43 are generally vertically disposed and are provided with generally vertically elongated slots or openings 43a which open laterally into or communicate with the respective adjacent trunk conduits 40, 41. The valve tubes 43 are of course tightly secured with respect to the trunk conduits 40, 41, and each of the valve tubes 43 is provided with a valve rod 44 screw threaded therein so as to provide means for adjusting the flow from the trunk conduits 40, 41 into each of the valve tubes 43. The lower end portions of the valve tubes 43 are all provided with suitable flexible tubing for connecting each of the valve tubes 43 to a different one of the pipe nipples 31–37. With this arrangement, ice cream or confection may be fed from a freezer or storage facility into the trunk conduits 40, 41 and then through the valve tubes 43 and the pipe nipples 31–37 and into the various pressure chamber sections 24–30. A bleeder valve 43b is provided for each of the trunk conduits 40, 41 so that the confection feeding system may be balanced.

It is noted that the relative flow into each of the various pressure chamber sections 24–30 with respect to one another may be adjusted easily by the valve rods 44. Of course, both of the trunk conduits 40, 41 may carry either the same or different flavors or colors of confection so that generally any pattern of product may be formed. With the illustrated structure, a confection of one color or flavor may be fed through the trunk conduit 40 to go into the wheel sections, window section and stack section of the die head 7, and the other trunk conduit 41 may be provided with a confection of a different flavor or color so as to contrast the main body portions 52, 53, 54 of the train engine with the wheels 55, window 56, and the stack 57.

In order to prevent the sticking or freezing of the confection passing through the die head 7 to the interior surfaces of the various inner sections and to prevent the formation of frost on the exterior surfaces of the peripheral wall 8 of the die head 7, so as to provide for the smooth, unobstructed and even flow or extrusion of confection through the die head 7, means is provided in accordance with the present invention for raising the temperature of the die head 7 above the temperature of the confection passing therethrough. As specifically illustrated in the drawings, such means comprises a pair of vertically spaced generally annular conduits 46, 47 disposed generally around the die head 7 and each having a plurality of apertures 48 which open generally inwardly toward the die head 7 so as to direct the flow of air upon the outer surface of the peripheral wall 8 thereof. This flow of air is represented by the arrows in FIG. 4 of the drawings. The upper annular conduit 46 is specifically illustrated as being secured to the upper surface of the divider partition 18, and the lower annular conduit 47 is secured to the bottom surface of said distributor plate 21. As shown in FIGS. 5 and 6, both of the annular conduits 46, 47 are joined together and connected to a suitable source of air under pressure. Other means may be substituted for the above-noted pressurized air supply for accomplishing the above-noted object of prevention of the freezing or sticking of the confection to the inner surfaces of the die head walls.

With respect to the related structure of the present invention, means is provided for slicing the confection extruded continuously from the bottom end of the die head 7, as shown in FIGS. 1 and 2. As shown, such means may comprise a pair of wires 49 carried by mounting arms 50 and provided with mechanism for reciprocating the wires in and out toward one another so that the same meet at a position generally centrally of the die head 7 for slicing the extruded confection into individual confections or treats, as shown in FIGS. 1 and 2. After being sliced by the wires 49, the individual confections drop upon trays 51 of the conveyor for moving the same to another location, such as into a freezer for quick hardening of the confections.

With the above in mind, it will be appreciated that a novel device has been described which permits the formation of confections having detailed configurations and formed of various flavors or colors of confection, and which are produced with a quality and accuracy of detail heretofore not possible.

This invention has been thoroughly tested and found to be completely satisfactory for the accomplishment of the above-noted objects; and while a preferred embodiment thereof in which the principles of the present invention have been incorporated has been shown and described above, it should be specifically understood that the same may be modified without departure from the scope and spirit of the appended claims.

What is claimed is:

1. An extruding die head for making confections and having an inlet and an outlet, said die head further comprising:
   (a) a peripheral wall formed to a configuration to define the outline of the confections and terminating in a lower edge portion to provide said outlet,
   (b) inner partition wall means separating said head into at least a pair of generally tubular extruding sections,
   (c) at least a portion of said partition wall means terminating in inwardly spaced relation to the outlet of said head, and the corresponding extruding section defined at least partly by said partition portion merging at said termination of said partition portion with another extruding section to combine the outputs thereof, and
   (d) means for compressing the merged portions of said combined confection streams together by increasing the pressure upon the combined confection streams generally at the level of combination of said confection streams and also for a distance downstream from said level of combination sufficient to securely weld said merging confection streams together, said compression means including sections of said peripheral wall and said inner partition wall means, one of said sections converging generally slightly inwardly with respect to the other from the level of said extruding section merger to the outlet of said head so as to cause said welding together of said merging streams.

2. A generally vertically disposed extruding die head for making confections and having an inlet and an outlet, said die head further comprising:
   (a) a vertically extending peripheral wall formed to a generally vertically extending configuration to define the outline of the confections and terminating in a lower edge to provide the outlet,
   (b) a plurality of inner partition elements extending from adjacent the inlet of said die head in directions toward the outlet thereof, said partition elements separating said head into a plurality of generally tubular extruding sections, and
   (c) said partition elements having lower end portions adjacent the outlet of said head terminating at various elevations with respect to the outlet of said head whereby each pair of adjacent extruding sections merge together at an elevation above the outlet of said die head, and
   (d) said peripheral wall being generally continuously slightly inwardly tapered from the level of the uppermost extruding section merger to the terminal edge of the peripheral wall at the outlet of said head whereby the confection streaming through said extruding sections will be welded together at each of said extruding section mergers.

3. The combination of claim 2 in which said head further comprises a distributor plate extending generally transversely to the axis of said head and disposed generally adjacent the inlet thereof, said plate having a plurality of inlet apertures leading into each of said extruding sections, said apertures for each of said sections being spaced to permit discharge into said extruding sections generally around the periphery thereof.

4. An extrusion nozzle for making confections having a peripheral wall and an inlet end portion and an outlet end portion, said nozzle comprising means for forming separate streams of the material of the confection, said forming means comprising a plurality of elongated conduits defined within said nozzle, said conduits extending from adjacent the inlet end portion of said nozzle and downstream therefrom in generally co-extending directions, at least some of said conduits terminating within said nozzle and at various elevations with respect to the outlet end portion of said nozzle for merging the confection streams thereof into contacting engagement, and means for pressing the streams together whereby to produce a confection in which the streams are welded together, said means for pressing the streams together comprising a slightly inward taper of said peripheral wall from the inlet end portion of said nozzle to the outlet end portion thereof.

5. A device as defined in claim 4 wherein the conduits of said means for forming the separate streams have exits at different downstream points, and wherein the axes of said conduits extend in general but not exact parallelism with one another.

6. An extruding die head for making confections and having an inlet and an outlet, said die head further comprising:
   (a) a peripheral wall formed to a configuration to define the outline of the confections and terminating in a lower edge portion to provide said outlet,
   (b) inner partition wall means separating said head into at least a pair of generally tubular extruding sections,
   (c) at least a portion of said partition wall means terminating in inwardly spaced relation to the outlet of said head, and the corresponding extruding section defined at least partly by said partition portion merging at said termination of said partition portion with another extruding section to combine the outputs thereof, and
   (d) means for compressing the merged portions of said combined confection streams together by increasing the pressure upon the combined confection streams generally at the level of combination of said confection streams and also for a distance downstream from said level of combination sufficient to securely weld said merging confection streams together,
   (e) said peripheral wall being slightly inwardly tapered from the level of said extruding section merger to the outlet of said head so as to cause said welding together of said extruding sections.

7. An extruding die head for making confections and having an inlet and an outlet, said die head further comprising:
   (a) a peripheral wall formed to a configuration to define the outline of the confections and terminating in a lower edge portion to provide said outlet,
   (b) inner partition wall means separating said head into at least a pair of generally tubular extruding sections,
   (c) at least a portion of said partition wall means terminating in inwardly spaced relation to the outlet of said head, and the corresponding extruding section defined at least partly by said partition portion merging at said termination of said partition portion with another extruding section to combine the outputs thereof, and
   (d) means for compressing the merged portions of said combined confection streams together by increasing the pressure upon the combined confection streams generally at the level of combination of said confection streams and also for a distance downstream from said level of combination sufficient to securely weld said merging confection streams together,
   (e) said peripheral wall and said inner partition wall means being formed and disposed relative to one another so that said extruding sections decrease slightly but generally continuously in cross-sectional area from the level of combination to the outlet of said head so as to cause said welding together of said combined streams.

References Cited

UNITED STATES PATENTS

| | | | |
|---|---|---|---|
| 2,214,325 | 9/1940 | Gothe | 107—1 |
| 2,249,311 | 7/1941 | Johnston et al. | 107—1 |
| 2,905,109 | 9/1959 | Schrenk | 107—1 |
| 3,014,437 | 12/1961 | Dutchess | 107—1 |
| 3,029,750 | 4/1962 | Burt et al. | 107—8 |
| 3,196,809 | 7/1965 | Nelson et al. | 107—1 |
| 3,213,808 | 10/1965 | Schafer | 107—1 |

WALTER A. SCHEEL, *Primary Examiner.*

J. SHEA, *Assistant Examiner.*